Nov. 9, 1954 G. W. PEABODY ET AL 2,693,637
METHOD FOR FORMING METAL PARTS
Filed Oct. 19, 1950 2 Sheets-Sheet 1
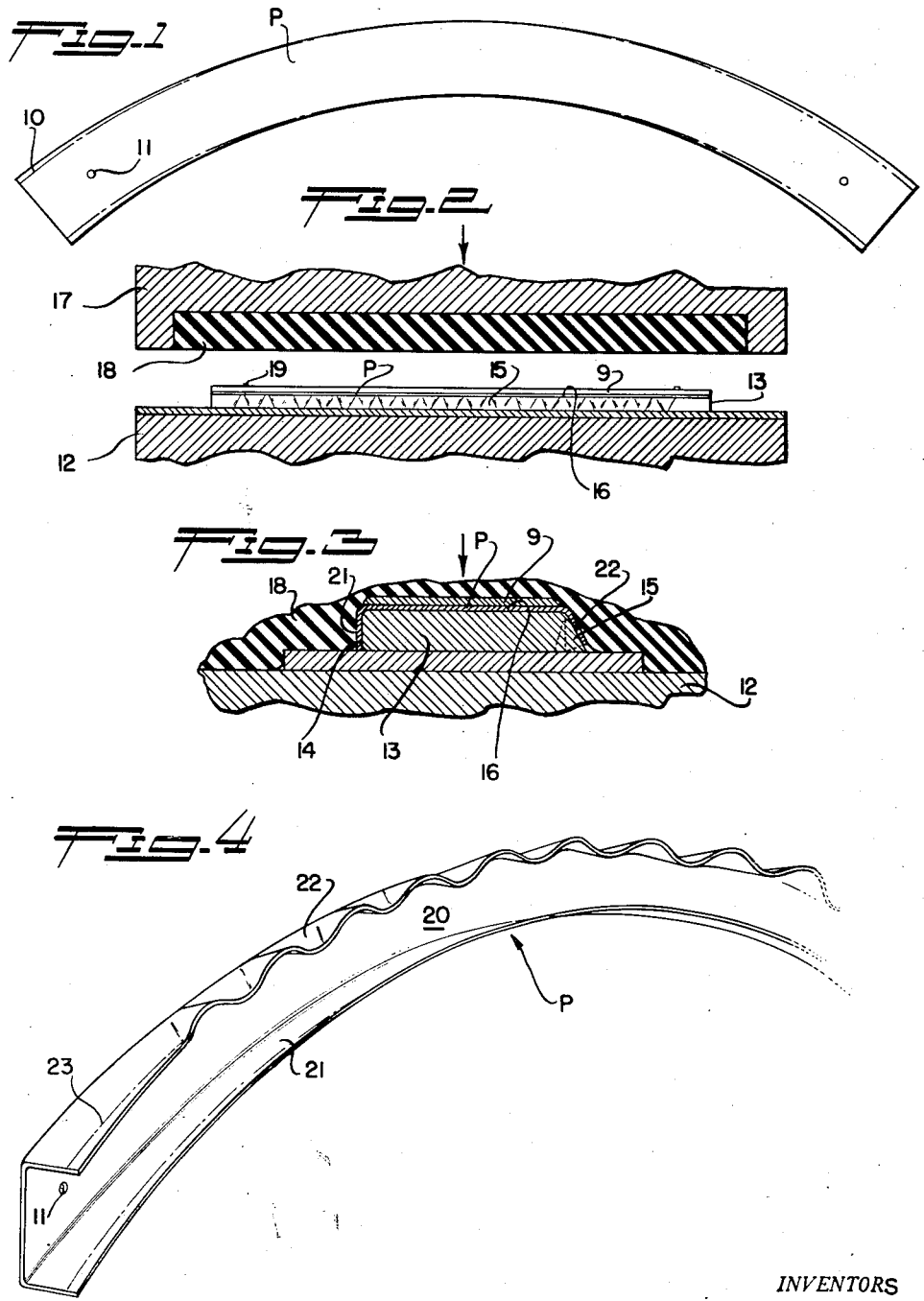
INVENTORS
GEORGE W. PEABODY
BY JOHN S. MITCHELL
Agent Nov. 9, 1954  G. W. PEABODY ET AL  2,693,637
METHOD FOR FORMING METAL PARTS
Filed Oct. 19, 1950  2 Sheets-Sheet 2
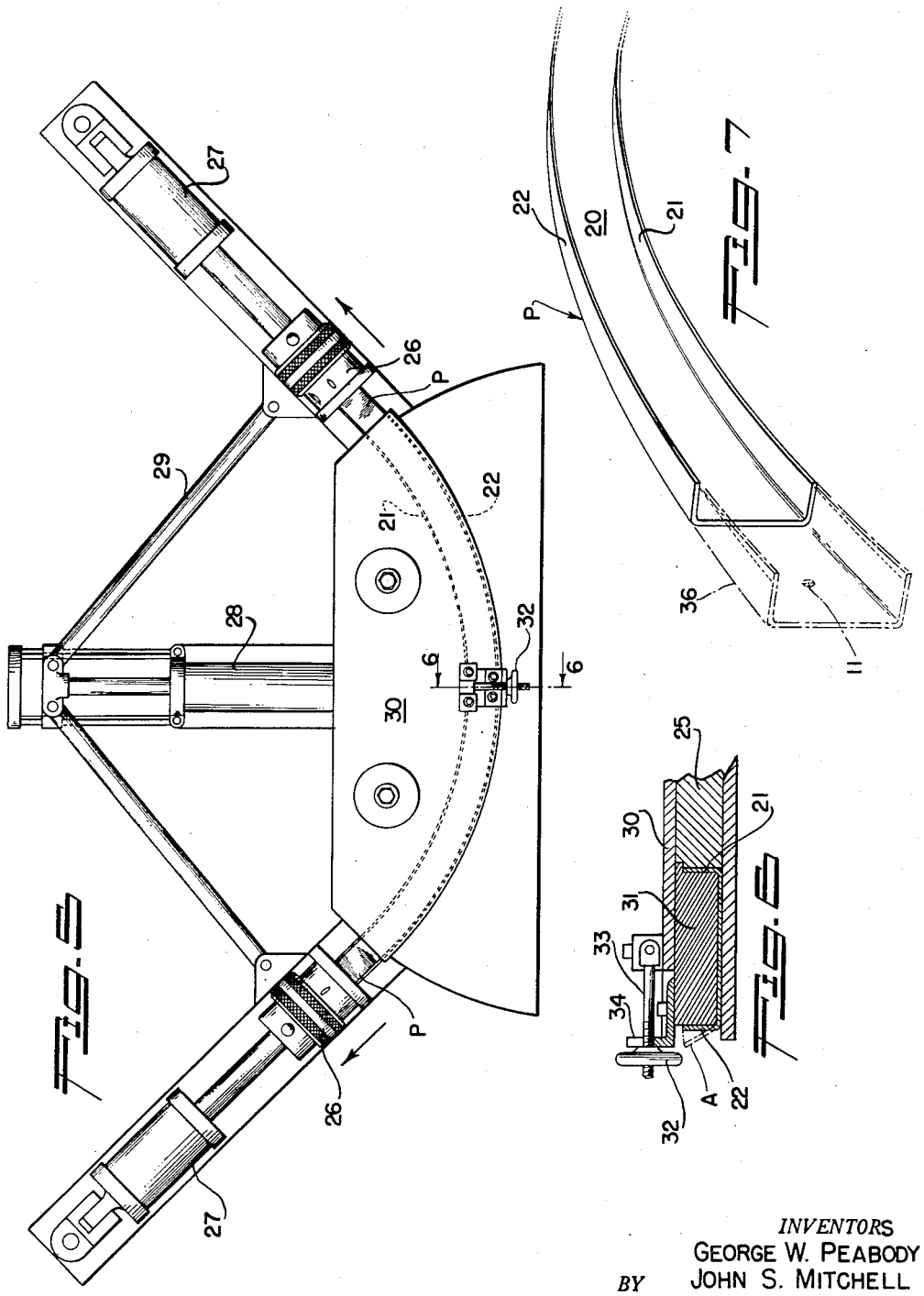
INVENTORS
GEORGE W. PEABODY
JOHN S. MITCHELL
BY
Agent

2,693,637

METHOD FOR FORMING METAL PARTS

George W. Peabody, San Fernando, and John S. Mitchell, North Hollywood, Calif., assignors to Lockheed Aircraft Corporation, Burbank, Calif.

Application October 19, 1950, Serial No. 191,008

4 Claims. (Cl. 29—550)

This invention relates to the art of metal forming and relates more particularly to methods for shaping or forming contoured metal parts.

In recent years the technique known as stretch forming has been used extensively to shape or contour parts such as channels, and the like. In the stretch forming operation the part is stretched or elongated to put it in the plastic "range" or condition by pulling or wrapping it against a die or stretch block of the desired shape and it is given a final stretch or elongation to "set" the part to the desired contour against the block, the block being scaled or "developed" to compensate for the spring-back characteristics of the particular material of which the part is constructed. Difficulties are often encountered when the metal of the part has low ductility, when the channel or other part has wide or deep flanges, where the part is to be stretch formed to a relatively small radius contour, etc. In the usual stretch forming process a major portion of the total available elongation of the outer fibers of the part (that is in the extreme outermost marginal regions) is utilized or required to merely put the inner fibers (that is the innermost marginal regions) in the plastic state and little, if any, elongation remains in the outer fibers for the final stretch or elongation that is required to set the part to contour. As a consequence, the stretch forming operation often results in material failure, or at least serious dimensional inconsistencies in the width and thicknesses of the flanges of the part.

Where the stretch forming method as used with stainless steel and other materials of low ductility is so critical for the reasons just pointed out, as well as for other reasons, such as the variations in the yield capabilities and elongation capabilities of mill runs of various metal manufacturers, the difficulty of scaling or proportioning the tooling, there are situations where the part cannot be successfully or, at least, practically formed with the usual stretch forming methods. The cross sectional configuration and the contour of the part may also be limiting factors, the usual stretch forming method being impractical where the channel web of the part is of large width and/or where the radius of contour is quite small.

It is an object of the present invention to provide a practical and effective method for forming contoured parts such as channels, and the like, wherein the critical outer fibers of the parts are not elongated or stretched to any appreciable degree during the stretch forming phase of the process, thereby avoiding the difficulties and limitations heretofore encountered in the stretch forming of such parts. In the method of the invention the majority of the fibers of the part are under substantially uniform tension during the final "set" stretch forming operation and the deformation is approximately equal or uniform throughout the part so that the developing or scaling of the stretch block is a simple matter devoid of the problems heretofore encountered and the parts are readily and conveniently contoured to size and shape within the allowable tolerances.

Another object of the invention is to provide a method for forming parts such as curved channels, and the like, that is characterized by the forming of corrugations, waves, or undulations in the outer flange or region of the part and by the subsequent stretch forming of the part, the stretch forming operation serving to straighten out the undulations and to give the part its final "set" or contour. The mere straightening of the undulations in the outer region of the part does not of itself stretch or elongate the outermost fibers but leaves these fibers in a virtually strain free state. Thus, theoretically, with the method of this invention, those regions of the part that are excessively elongated in the conventional stretch forming method, to the end that the part may fail or be dimensionally inaccurate, are substantially free of stretch and strain in the circumferential or longitudinal direction, permitting much greater elongation of the remaining portions of the part, the contouring to smaller radii, etc. However, in practice, these outermost fibers of the part may be stretched or elongated to a very minor extent, say to the extent of 1% to assure a proper and permanent setting of the part to the desired contour. Where the region of the part that has heretofore been critical insofar as the extent of elongation is concerned is not elongated to any appreciable extent with the method of of this invention it will be apparent that the invention overcomes many of the limitations and difficulties of the previous forming methods.

Other objectives and features will become apparent from the following detailed description of a typical preferred manner of performing the process or method of the invention, throughout which reference is made to the accompanying drawings wherein:

Figure 1 is a plan view of the part or blank to be formed;

Figure 2 is a fragmentary vertical sectional view of a hydropress apparatus with the blank in position on the die prior to the forming operation;

Figure 3 is an enlarged fragmentary sectional view of the hydropress showing the part formed therein;

Figure 4 is a fragmentary perspective view of the blank or part as formed in the hydropress;

Figure 5 is a more or less diagrammatic plan view of a stretch press showing the part therein in the process of being stretched to contour;

Figure 6 is an enlarged fragmentary sectional view taken substantially as indicated by line 6—6 on Figure 5 with the broken lines illustrating the position of the undulations in the outer flange of the part prior to the stretching operation; and Figure 7 is a fragmentary perspective view of the finished part with the broken lines illustrating the portion that is removed following the stretch forming operation.

The drawings illustrate the various phases or steps of the method of this invention as employed to form an arcuate or segmental part P of channel-shaped cross section to the desired or final contour. It may be considered that the part P is constructed of work hardened stainless steel or other material of low or relatively low ductility. However, the invention is not to be construed as limited or confined to the forming of parts of any particular contour or cross sectional configuration or of parts fabricated from any given material or class of materials, the particular part P, illustrated, merely being typical of those that may be formed with the method.

In Figure 1 there is illustrated a segmental part P in the nature of a flat elongate sheet or strip having curved and generally concentric inner and outer margins. This blank P is preferably of slightly increased width toward its ends, the broken lines 10 in Figure 1 being concentric to illustrate in a diagrammatic manner the slight divergence of the inner and outer margins of the blank or part P in its broadened end regions. The gradual increase in width of the blank or part P toward its ends is to compensate for the reduction in width which accompanies the subsequent stretching of the part and is for other reasons. The end portions of the part P are also provided with openings 11.

In accordance with the invention the blank, such as the part P, is first formed to its required cross sectional configuration, for example to a channel-shape. This initial forming may be accomplished in any selected or desired manner, for example, it may be performed in what is known as a hydropress. Figures 2 and 3 illustrate the steps of forming the part P in such a hydropress. The hydropress, as illustrated, has a bed 12 which supports a die 13. This die 13 is shaped to give the blank or part P the required cross-sectional configuration and the general longitudinal or circumferential contour, Thus, in the case illustrated, the die 13 has a flat upper surface 16, an inner edge or surface 14 curved circumferentially or longitudinally, and an outer edge or surface that is also circumferentially curved and substantially concentric with the surface 14. This outer edge or surface is formed or provided with a series of undulations 15, that is it has a series of wave crests and troughs. These waves or undulations 15 are defined by gentle curved surfaces and are conical or sloping, being of the greatest width and thickness at the base of the die 13 and dying out toward the top surface 16 of the die 13. The hydropress further includes a ram or platen 17 provided at its under surface with a body 18 of flowable rubber, rubber composition, or the like. The rubber body 18 is recessed in the face of the platen 17 so that its upper surface and its edges are confined in the platen.

The blank or part P is placed on the upper surface 16 of the die and is located thereon by pins 19 received in the above described openings 11 of the blank. A pressure plate 9 may be placed on the upper surface of the web 20 to reduce the tendency for the part P to shift as the rubber body 18 deforms and to increase the pressure on the web. When the hydropress is operated the platen 17 is moved downwardly toward the bed 12 so that the rubber body 18 presses against and flows about the blank or part P to form it to the die 13. Figure 3 shows the hydropress rubber body 18 after it has shaped or formed the part P to the die 13, the rubber having forced or shaped the inner and outer edge portions of the blank against the inner and outer surfaces of the die so that the part P has a main web 20 formed against the top surface 16 of the die, an inner flange 21 formed against the inner surface 14 and a waved or undulated outer flange 22 formed against the undulations of the die.

The part P, when removed from the hydropress, is substantially as illustrated in Figure 4, having a corrugated or undulated outer flange 22 and a smoothly or regularly curved inner flange 21. The end portions of the part P as formed in the hydropress, are wider or deeper than the balance of the part, the flanges 21 and 22 being wider toward their ends by reason of the increased width of the blank, as illustrated in Figure 1. The broken lines 23 in Figure 4 are generally parallel with the main web 20 and illustrate the increased width or divergence of the end portions of the flanges. It will also be noted that the end portions of the outer flange 22 may be devoid of the above described undulations as the end parts of the blank or part P are to be subsequently gripped in the stretch press and then cut off or removed following the final forming operation.

The part P, as formed in the hydropress as just described, is contoured and shaped to approximately the intended final shape. However, the part P is substantially strain free in the circumferential direction at this time and it is important to note that the outer flange 22 has an excess of material contained in its undulations, assuming that the flange is to be ultimately formed to a smooth curve generally concentric with the inner flange 21. In accordance with the invention the part P formed in the hydropress, as just described, or otherwise formed to be as illustrated in Figure 4, is stretch formed to its final or desired contour and size. Figures 6 and 7 illustrate the part P in a typical stretch press which comprises a block 25, gripping jaws 26 actuated by cylinders 27 and a cylinder 28 acting through links 29 to change the angularity of the stretch jaws 26. The invention is not primarily concerned with the specific details of the stretch press and any appropriate type of stretch pressing apparatus may be employed. The face of the block 25 is curved and the block has an overlying plate 30. A properly shaped elongate segmental block 31, usually termed a "snake," is arranged in the pre-contoured or hydro-pressed part P and the assembly of the part P and the snake 31 is arranged in the stretch press to have the inner flange 21 bear against the face of the block 25. The snake 31 is restrained against unwanted movement by a nut 32 cooperating with a bracket 34 on the snake, the nut being threaded on a screw 33 secured to the plate 30. The opposite end portions of the part P are securely gripped in the jaws 26 and the stretch press is actuated, the cylinder mechanisms 27 operating the jaws in the direction of the arrows in Figure 5, to exert a substantial pull or stretching force on the part. This stretch forming operation is to give the part P its final or desired form or contour and to "set" it in this shape. During this final operation the undulations in the outer flange 22 are pulled out, that is the flange is smoothed out to conform with the outer surface of the snake 31. The broken lines A, in Figure 6, illustrate the approximate position of the crests of the undulations prior to the stretch press or stretch forming operation, while the full lines show the flange 22 stretch formed against the snake 31.

During the above described stretch forming of the part P, its fibers are in tension and are elongated. However, because of the preformed undulations in the outer flange 22, the outermost fibers of the flange need not be elongated appreciably. In other words, the stretch forming and/or setting of the part P to its final contour, as above described, is accompanied by a "flattening out" or straightening of the undulations of the flange 22 which, of itself, does not necessarily involve or require any actual elongation of the outer fibers of the flange. Accordingly, this region of the part, which in the usual stretch forming operation is subjected to the greatest elongation and therefore subject to failure or excessive reduction in thickness due to excessive elongation, remains substantially strain free and the stretch forming operation is not limited in the present invention, even with materials of low ductility, by the ability of the outer fibers to elongate concurrently with the fibers of the smaller contour radii. Thus, with the method of the invention, the part P has the substantially complete elongation potential of its material available at the time the part is to be stretched and the difficulties of the earlier stretch forming methods are avoided. Where the outer fibers of the part P remain substantially strain free, at least in the circumferential or longitudinal direction, as just described, the deformation of the part as a result of the stretch forming operation is substantially uniform throughout the part and where the tension on the part during the stretching operation is well distributed throughout the scaling, proportioning, or "developing" of the tooling to compensate for spring-back is relatively simple and is not complicated as in the prior stretch forming methods. While in theory the outermost fiber of the flange 22 need not be elongated or strained in the circumferential or longitudinal direction, as a result of the final stretching operation, it may be preferred in practice to stretch or elongate the part P sufficiently to positively assure a complete and permanent "straightening" of the previously undulate flange 22. Thus, in practice, the outer fiber of the flange 22 may be elongated approximately 1%, this being only a small proportion of the total available elongation which, in the case of work hardened stainless steels and the like, is in the neighborhood of 15%.

The part P, as initially formed and shaped in the hydropress, or by other means, is sufficiently long to have opposite end portions extend substantially tangential to the block 25 when the part is secured in the stretch press. These end portions are gripped at their extremities by the jaws 26 and, as above described, the part P is gradually tapered or made wider toward its ends. This increase in width is to compensate for the variable reduction in the width of the part P due to the tension applied during the stretch forming operation and to assure substantially uniform transmission of the tension to those portions of the part that are engaged in the stretch forming machine to overcome the increased friction at those engaged portions. Furthermore, the regions or portions of increased width toward the ends of the part P reduce or eliminate the possibility of failure in the unsupported tangential portions beyond the stretch forming block 25. At the completion of the stretch forming operation and upon removing the part P from the stretch forming machine, these end portions 36 are removed or cut off as indicated by the broken lines in Figure 7.

From the foregoing detailed description it will be seen that we have provided a simple and altogether practical method for contouring or forming parts which method avoids the difficulties heretofore encountered in the contouring by conventional stretch forming methods. The present method makes it commercially feasible to contour or form parts that could not otherwise be formed by the usual methods.

Having described only a typical form of the invention we do not wish to be limited to the specific details herein set forth, but wish to reserve to ourselves any variations or modifications that may appear to those skilled in the art and fall within the scope of the following claims.

We claim:

1. The method of forming a curved part having an outer flange thereon, comprising taking a flat elongate metal strip having a convex outer edge and a concave inner edge whose width increases slightly from the center toward its ends, shaping said strip to form a flange along the outer convex edge while simultaneously forming undulations in the flange to take care of the excess, whereby the web portion is of uniform width and the flange of increased height from the center toward the opposite ends, and then stretch-forming the part to final contour while in confined dies by exerting longitudinal tension on the part throughout substantially its entire length and width thereby elongating the part sufficiently to simultaneously remove the undulations from said flange and substantially equalize the heighth of said flange from end to end while leaving the fibers of the flange substantially unstretched.

2. The method of forming a curved part having an outer flange thereon, comprising taking a flat elongate metal strip having a convex outer edge and a concave inner edge whose width increases slightly from the center toward its ends, shaping said strip to form a flange along the outer convex edge while simultaneously forming undulations in the flange to take care of the excess, whereby the web portion is of uniform width and the flange of increased height from the center toward the opposite ends, and then stretch-forming the part to final contour while in confined dies by exerting longitudinal tension on the part throughout substantially its entire length and width thereby elongating the part at least approximately 1% so as to simultaneously remove said undulations from said flange and substantially equalize the width of said flange from end to end while leaving the fibers of the flange substantially unstretched.

3. The method of forming a curved part having an outer flange thereon, comprising taking a flat elongate metal strip having a convex outer edge and a concave inner edge whose width increases slightly from the center toward its ends, shaping said strip to form a flange along the outer convex edge while simultaneously forming undulations in the flange to take care of the excess, whereby the web portion is of uniform width and the flange of increased height from the center toward the opposite ends, stretch-forming the part to final contour while in confined dies by grasping the ends of said part in a stretching machine and exerting longitudinal tension on the part throughout substantially its entire length and width thereby elongating the part sufficiently to simultaneously remove the undulations from said flange and substantially equalize the heighth of said flange from end to end while leaving the fibers of the flange substantially unstretched, and then removing the ends of said part which were grasped by the stretch forming machine.

4. The method of forming a channel-shaped member comprising taking a flat arcuate elongate metal strip having a convex outer edge and a concave inner edge whose width increases slightly from the center toward its ends, shaping said strip to form flanges along each edge while simultaneously forming undulations in the outer flange to take care of the excess, whereby the web portion is of uniform width and the flanges are of increased heighth from the center toward the ends, and then stretch-forming the part to final contour while in confined dies by exerting longitudinal tension on the part throughout substantially its entire length and width thereby elongating the part sufficiently to simultaneously remove the undulations from said outer flange and substantially equalize the heighth of said flanges from end to end while leaving the fibers of the flanges substantially unstretched.

References Cited in the file of this patent

UNITED STATES PATENTS

| Number | Name | Date |
|--------|------|------|
| 782,509 | Livingston | Feb. 14, 1905 |
| 1,246,583 | Fulweilder | Nov. 13, 1917 |
| 1,748,772 | Hunker | Feb. 25, 1930 |
| 2,105,944 | Graf | Jan. 18, 1938 |
| 2,166,226 | Vehko | July 18, 1939 |
| 2,330,572 | Frey et al. | Sept. 28, 1943 |
| 2,342,858 | Hansen | Feb. 29, 1944 |
| 2,395,692 | Snow et al. | Feb. 26, 1946 |
| 2,464,169 | Bently | Mar. 8, 1949 |